United States Patent [19]

Albrecht

[11] Patent Number: 5,000,488

[45] Date of Patent: * Mar. 19, 1991

[54] ADAPTER FITTINGS AND CONNECTORS

[76] Inventor: David E. Albrecht, 1383 Granary Rd., Blue Bell, Pa. 19422

[*] Notice: The portion of the term of this patent subsequent to Dec. 26, 2006 has been disclaimed.

[21] Appl. No.: 420,891

[22] Filed: Oct. 13, 1989

[51] Int. Cl.⁵ .............................................. F16L 25/00
[52] U.S. Cl. ....................................... 285/12; 285/39; 285/368; 285/212
[58] Field of Search .................. 285/12, 39, 368, 412, 285/413, 414, 415, 337, 212, 219, 220

[56] References Cited

U.S. PATENT DOCUMENTS

| 176,796 | 5/1876 | Martin | 285/390 X |
|---|---|---|---|
| 398,068 | 2/1889 | McEwan | 285/39 X |
| 795,390 | 7/1905 | Hays | 285/390 X |
| 2,163,212 | 6/1939 | Reddick | 285/12 |
| 2,866,473 | 12/1958 | Schutter | 285/39 X |
| 4,023,836 | 5/1977 | Applehans | 285/413 X |
| 4,887,850 | 12/1989 | Albrecht | 285/368 X |
| 4,889,369 | 12/1989 | Albrecht | 285/368 X |

*Primary Examiner*—Dave W. Arola
*Attorney, Agent, or Firm*—Frank A. Follmer

[57] ABSTRACT

An adapter fitting made of two parts, a mounting member containing a fluid cavity and a flange member having bolt holes therein, is designed to enable fluid flow components of the type which can be bolted together and provide sealing at mating faces to be used with threaded connections and bolt-on flange connections.

20 Claims, 8 Drawing Sheets

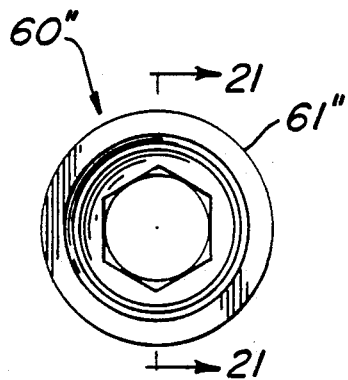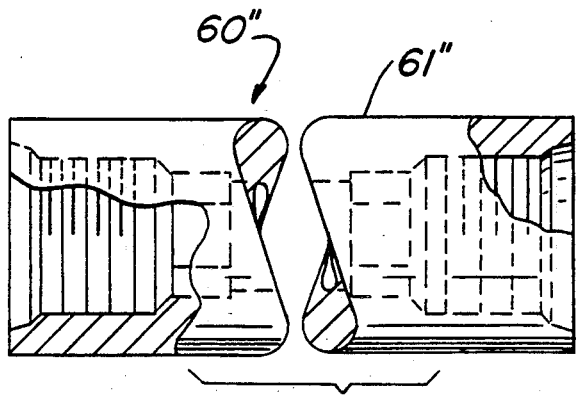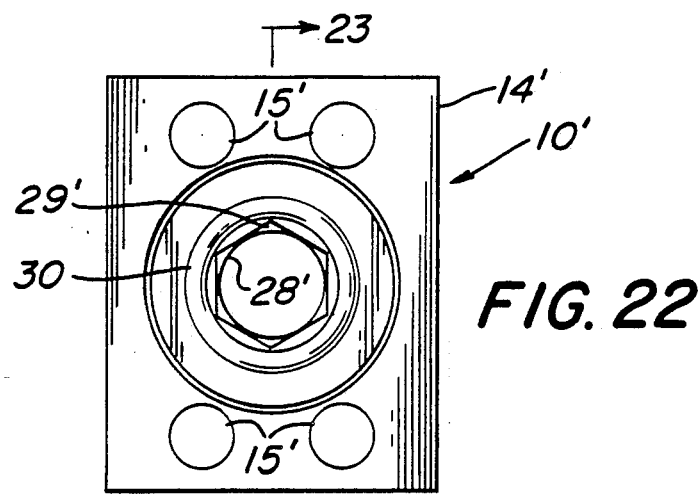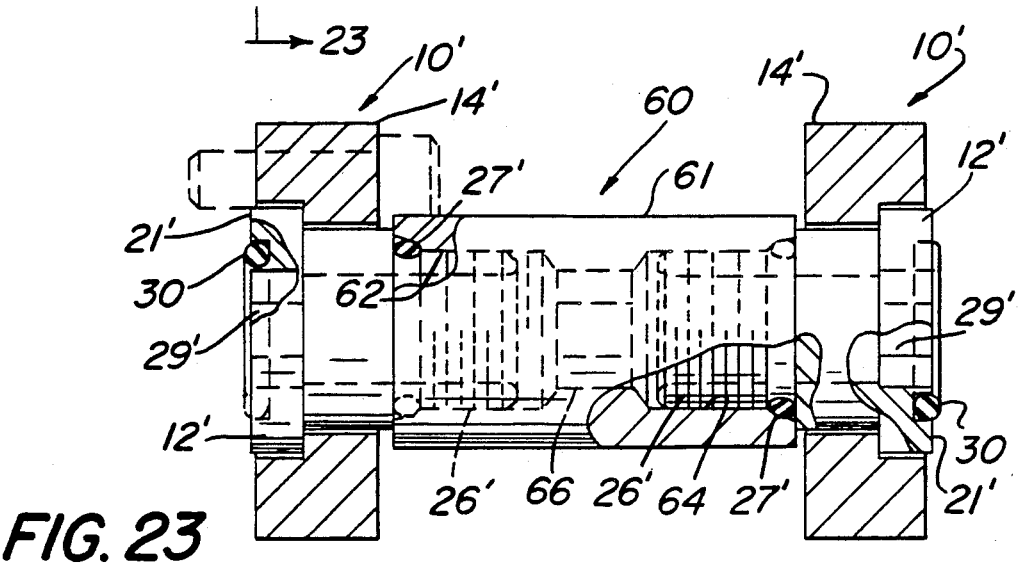

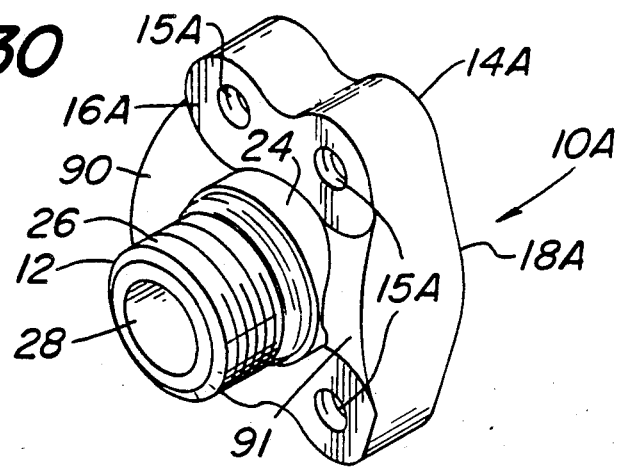
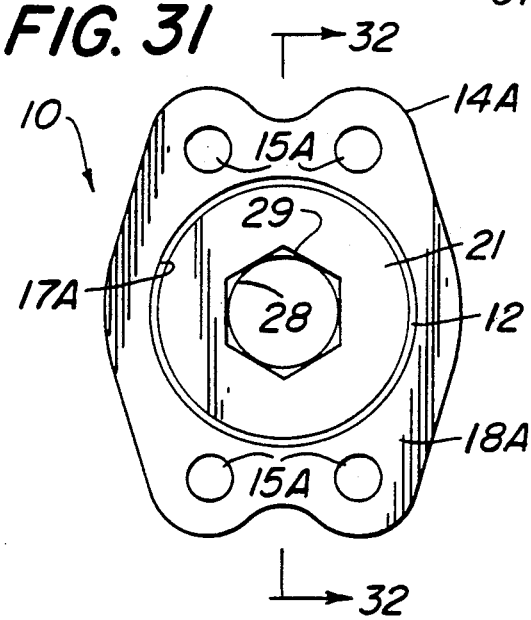
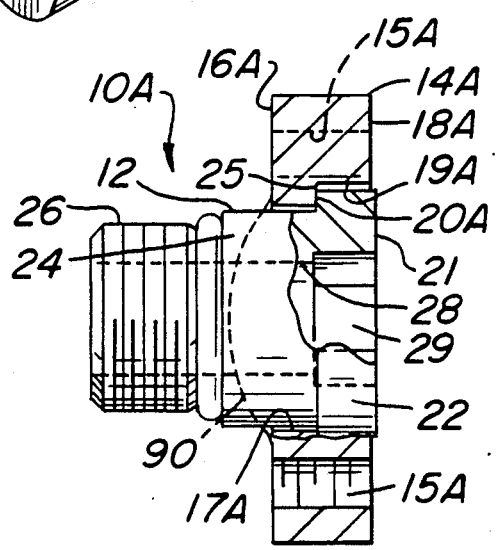
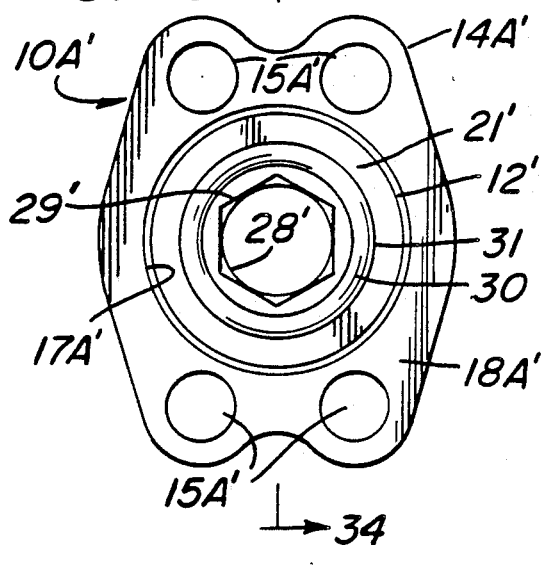
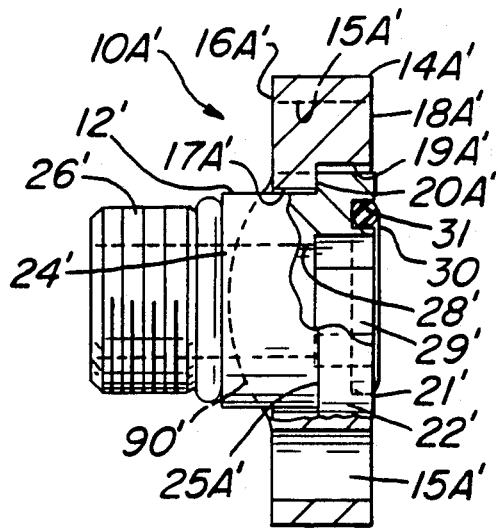

ADAPTER FITTINGS AND CONNECTORS

BACKGROUND AND SUMMARY OF THE INVENTION

This invention relates to the art of fluid flow piping systems and, more particularly, to adapter fittings and connectors for use in such systems.

Piping, hose and tubing systems have been in use for many years for harnessing fluid flow. In the past fifty years the need to harness flows of higher pressures has arisen and there have been provided many adapters and connecting systems in an attempt to better utilize fluid flow systems. These systems have attempted to provide constructions which contain the flow without failures or leakage and with ease of assembly and maintainability. More recently, the hydraulic industry in the United States has promoted the SAE Straight Thread Standard J1926 and the SAE Four Bolt Standard J518 as the ports that best meet this criteria. Further, the rest of the world is tending to follow the United States industry in this regard. However, the connecting of these systems with the devices of the prior art is accomplished in an awkward and inefficient manner by employing numerous connectors in combination to make the interconnection between the fluid flow components. While welded connections have been used to help reduce the number of connectors and improve the integrity of the assembly, this generally involves higher costs.

In practice, it is always desirable to have a component terminate at a flange port. The SAE Four Bolt Standard J518 port incorporates a port with a flat flange face surface and four taped mounting holes in a rectangular bolt pattern. The SAE Straight Thread Standard J1926 port has a counterbored face containing a standard O-ring which makes for a virtually leakproof joint while the straight thread is employed only for the mechanical strength of the joint. By having a component terminate at a flange port, each component may be easily slipped out of the system simply by removing the bolts holding the connecting flanges together. However, in present-day systems, many components are only supplied with SAE straight threads or the old tapered pipe threads. Also many components, when supplied with the SAE flange ports, are available at a significant premium in price. Accordingly, for the above-stated reasons, it is necessary to make a large number of thread-to-flange connections and with the present-day connection fittings available in the art, it is inefficient to do so.

It is the general object of the invention to provide a vastly improved system and devices for adapting and connecting threads to flange ports. Preferably, this system will employ the straight thread as this ensures a virtually leakproof connection and the accurate positioning of the flange. An important advantage of the system of the invention is that a small number of connectors are required to provide a large number of efficient and effective connecting means.

The present invention is an improvement over the adapter fitting disclosed in my copending application Ser. No. 776,497 filed Sept. 16, 1985 now U.S. Pat. No. 4,889,369, wherein it is taught how to effectively adapt a thread to a flange. In accordance with the present invention, the art is taught how to further connect the adapter fittings of said patent application to various novel connectors to very efficiently and effectively mechanically interconnect system components. Moreover, this desirable result is achieved in a manner that does not require welding and employs a minimum of connectors, time, skill and effort while ensuring a virtually leakproof system of high integrity that also permits easy maintenance and replacement of components.

More specifically, the invention solves one of the greatest needs and desires of the hydraulic industry, namely, to eliminate port leakage and improve system integrity by permitting the use of only SAE straight thread ports and SAE four bolt ports pursuant to SAE standards. The invention provides an effective adapter system between the above-described SAE straight thread ports and the SAE four bolt ports, which are the two preferred ports of the hydraulic industry.

BRIEF DESCRIPTION OF THE DRAWINGS

FIGS. 20 and 21 are end and side views, respectively, of another type of connector in accordance with the invention.

FIG. 22 is a front elevation of two adapter flanges in accordance with the invention assembled to a connector to provide a flange connector assembly.

FIG. 23 is a sectional view of the assembly shown in FIG. 22.

FIG. 30 is a perspective view of another adapter fitting in accordance with the invention.

FIGS. 31 and 32 are elevational and sectional views of the adapter fitting shown in FIG. 30.

FIGS. 33 and 34 are elevational and sectional views of another adapter fitting in accordance with the invention.

DETAILED DESCRIPTION OF THE PREFERRED EMBODIMENTS

Figure 1:
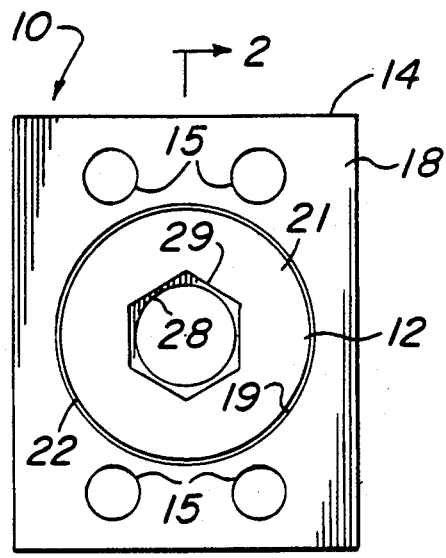
FIG. 1 is a front elevation of an adapter fitting in accordance with the invention.
Figure 2:
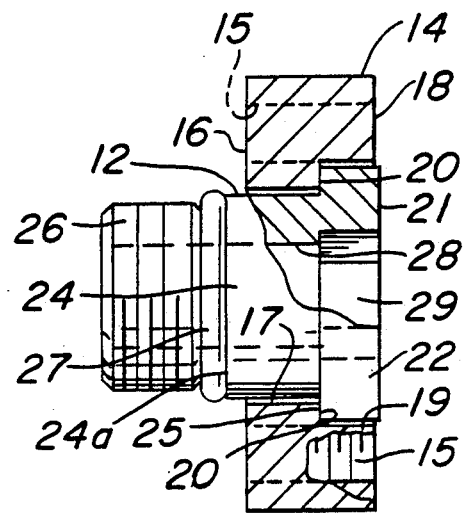
FIG. 2 is a sectional view taken generally on line 2—2 of FIG. 1.

In FIGS. 1 and 2, there is shown an adapter fitting 10 for converting a straight threaded port to a flange port. Adapter fitting 10 comprises two parts, namely, a mounting member 12 and a flange member 14. Flange member 14 is provided with four threaded bolt holes 15 arranged in a bolt pattern comprising a rectangular configuration (pursuant to the SAE standard) as is best shown in FIG. 1. Flange member 14 has a cylindrical bore extending between the spaced apart, parallel faces 16 and 18 thereof and located in the center of the bolt pattern. This central bore comprises a bore portion 17 extending inwardly from face 16 and a bore portion 19 extending inwardly from face 18. Bore portion 19 has a larger diameter than bore portion 17 whereby they meet at an annular shoulder 20. Mounting member 12 has a cylindrical shape and is positioned in the central bore portions 17 and 19 in the center of the bolt pattern of flange member 14 and is adapted to be fastened to the threaded connection of a compatible threaded port such as a fluid flow component that terminates at a straight threaded outlet port. Mounting member 12 has an enlarged diameter portion 22 received in the large bore portion 19 of flange member 14, a reduced diameter portion 24 received in the smaller bore portion 17 of flange member 14, and an annular shoulder 25 as is shown in FIG. 2. By this construction, annular shoulder 25 of mounting member 12 is arranged to mate with the annular shoulder 20 of flange member 14 so as to limit relative movement therebetween in one direction for holding the parts in the position as shown in FIG. 2. The reduced diameter portion 24 of mounting member 12 extends beyond or outwardly from the face 16 of flange member 14 and terminates at an externally threaded end portion 26. An O-ring seal 27 extends around the circumference of the threaded end portion 26 at the inward end thereof, as shown in FIG. 2, to provide sealing contact with the internal wall portion of the threaded outlet port to which this portion is to be engaged, such as a standard (SAE) straight thread port. A radially extending annular wall 24a is formed on mounting member portion 24 adjacent O-ring seal 27. When adapter fitting 10 is connected to a positive seal straight thread, such as the standard SAE straight thread port, and others, wall 24a provides a shoulder which is used as a positive stop for the thread, which permits prestressing of the thread, and which allows the shoulder surface to be held under compression to maintain a positive retaining surface between the shoulder surface and the mating component. This permits sealing ring 27 to be extremely effective as a positive seal.

Mounting member 12 is provided with a central axially extending bore 28 providing a fluid flow passage which extends completely through the mounting member 12 from the threaded end 26 to the annular face 21 thereof which extends slightly beyond the face 18 of flange member 14 when shoulders 20 and 25 mate as is apparent from a consideration of FIG. 2. It is important that face 21 extend slightly beyond face 18 so as not to interfere with the sealing means that cooperate with face 21.

Mounting member 12 is provided with a wrenching surface 29 to aid in fastening the mounting member 12 to the threaded outlet. As shown in FIGS. 1 and 2, wrenching surface 29 comprises an internally broached hexagonal configuration. However, it will be apparent that other types of wrenching surfaces may be employed, such as spanner holes or the like. By providing the wrenching surface 29 internally of the mounting member 12 and extending it inwardly from the face 21 thereof, the design allows for a mounting that is of a minimum length.

It will be noted that the face of the component bolted to the flange member 14 of adapter fitting 10 will have a seal extending around the fluid passage bore 28. This sealing is accomplished as the seal meets the face 21 of the mounting member 12 in an area extending around the opening of fluid passage bore 28 therein. It will be noted that the flange member 14 participates in the fastening of adapter fitting 10 to the fluid components, but is not involved in any sealing action, the fluid passage bore 28 being entirely enclosed within the mounting member 12.

Figure 3:
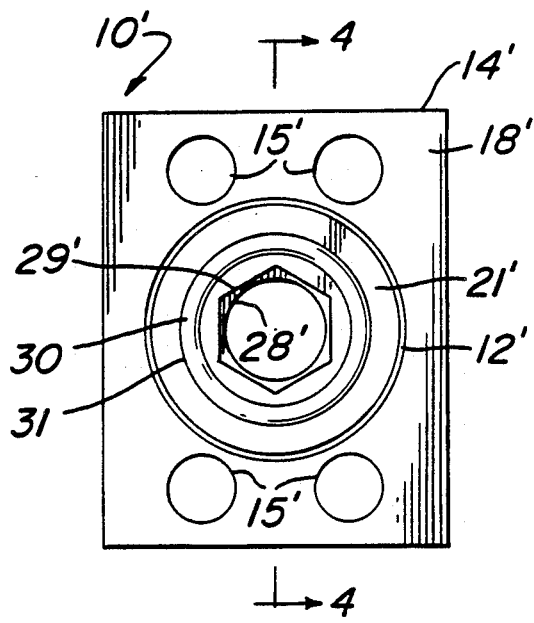
FIG. 3 is a front elevational view of another adapter fitting in accordance with the invention.
Figure 4:
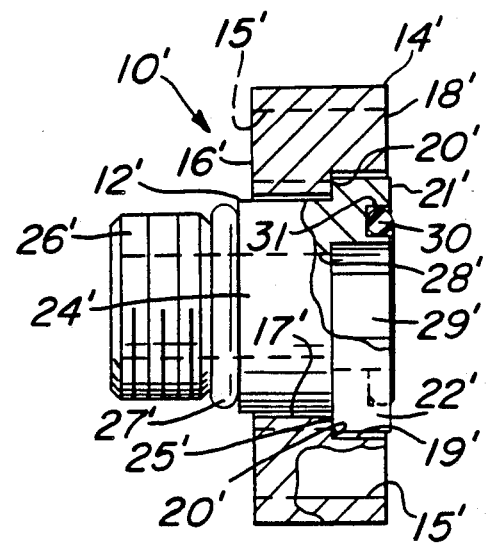
FIG. 4 is a sectional view taken generally on line 4—4 of FIG. 3.

In FIGS. 3 and 4 there is shown an adapter fitting 10' for converting a straight threaded port to a flange of a construction corresponding to the flange provided by adapter fitting 10. Adapter fitting 10' is essentially the same as adapter fitting 10 except that there is provided a face-mounted seal on the mounting member and the flange member is provided with through (non-threaded) bolt holes. Further, as seen by a comparison of FIGS. 1 and 2 and FIGS. 3 and 4 adapter fitting 10' is comprised of parts having similar construction and dimension as corresponding parts of adapter fitting 10. Thus, corresponding parts of adapter fitting 10' have been provided with the same reference numerals as those of adapter fitting 10 with primes added.

Adapter fitting 10' is comprised of two parts, namely, a mounting member 12' and a flange member 14'. Flange member 14' is identical in construction with flange member 14 except that the four bolt holes 15' thereof, which are arranged in the identical rectangular configuration as bolt holes 15, are through (non-threaded)bolt holes. Thus, flange member 14' has a cylindrical bore comprised of bore portions 17' and 19' extending between faces 16' and 18' and meeting at an annular shoulder 20'. Mounting member 12' is cylindrical and is positioned in the central bore portions 17' and 19' in the center of the bolt pattern of flange member 14' and is adapted to be fastened to the threaded connection of a compatible threaded port, such as a fluid flow component that terminates at a straight threaded outlet port. Mounting member 12' has portions 22' and 24' which form an annular shoulder 25' arranged to mate with the annular shoulder 20' of flange member 14'. Portion 24' of mounting member 12' extends beyond face 16' of flange member 14' and terminates at an externally threaded end portion 26'. An O-ring seal 27' is provided to provide a sealing contact with the internal wall portion of a threaded outlet port to which end portion 26' is engaged. The parts are configured so that adapter fitting 10' can be connected to a positive seal straight thread, such as the standard SAE straight threaded port as described above with respect to FIGS. 1 and 2.

Mounting member 12' is provided with a central axially extending bore 28' providing a fluid flow passage through adapter fitting 10'. Mounting member 12' is provided with a wrenching surface 29' formed of an internally broached hexagonal configuration, and arranged to extend inwardly from face 21' so as to provide a mounting that is of a minimum length.

An O-ring sealing member 30 is mounted in an annular recess 31 in the face 21' of mounting member 12' and is constructed to project slightly from this face so as to provide good sealing contact with a fluid flow component mounted in face-to-face contact adjacent thereto. The wrenching portion 29' is located within the annual recess 31 as is apparent from FIG. 3.

In my above-mentioned patent application there is described the use of the adapter fittings 10 and 10' to convert flow components from a threaded connection to a flange connection and the features and advantages of these fittings is set forth therein. Thus, in one example set forth in my prior application, the adapter fitting 10 can be used to provide connection requiring only one unit with very little assembly time instead of a connection involving the prior art connectors which requires four joints and a lengthy assembly time. Moreover, adapter fitting 10 provides a very compact connection as discussed in said prior application.

Figure 5:
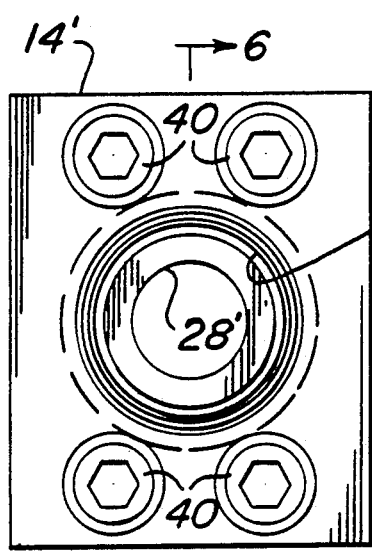
FIG. 5 is a front elevational view of a union comprising two adapter fittings in accordance with the invention.
Figure 6:
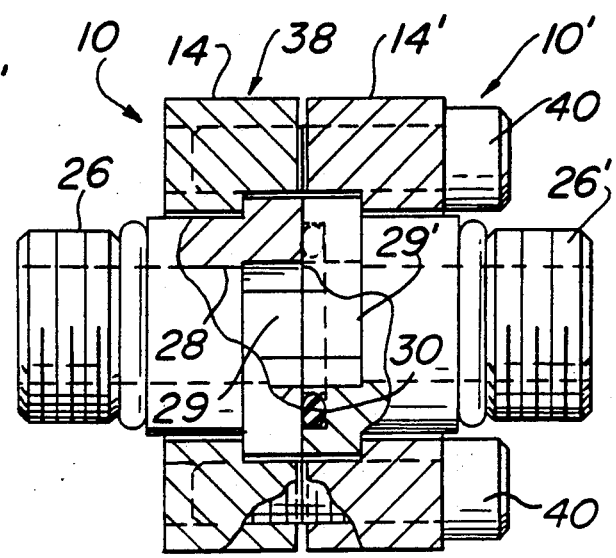
FIG. 6 is a sectional view taken generally on line 6—6 of FIG. 5.

In FIGS. 5 and 6 there is shown a preferred union flange connection wherein adapter fittings 10 and 10' are mounted together with their faces mating. This connection 38 ensures a virtually leakproof connection while affording easy component removal from a fluid flow system. Adapter fittings 10 and 10' are secured together in mating relationship by bolts 40 which are arranged to pass through the nonthreaded holes 15' of adapter fitting 10' and to engage the threaded holes 15 of adapter fitting 10 so as to draw and hold the two flange members 14 and 14' together. Sealing between the two opposing faces 21 and 21' is accomplished with the seal 30 provided in the face 21' of adapter fitting 10'. It will be apparent that the adapter fittings 10 and 10' may be connected to flow components having threaded ports by means of their threaded portions 26 and 26', respectively.

Figure 7:
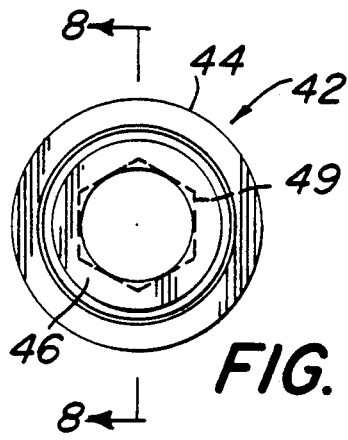
FIGS. 7 and 8 are end and side views, respectively, of a port extender in accordance with the invention.
Figure 8:
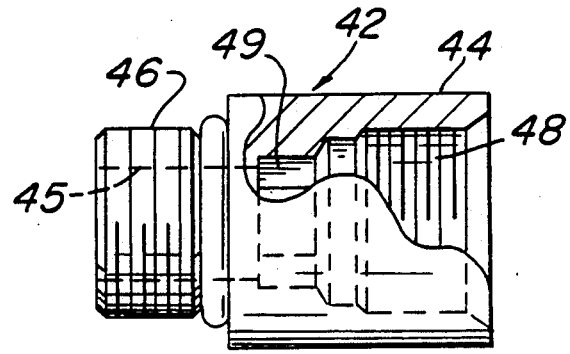

In FIGS. 7 and 8 there is shown a port extender 42 for use in extending the adapter fittings 10 and 10' farther away from a threaded port to which they are to be connected. This eliminates interference problems and places the flange connection in a more convenient location. Use of port extender 42 also provides room to insert bolts into the bolt holes 15 or 15' and to engage them with a wrench in the event that the geometries of the threaded components being joined should be restrictive in some way.

Port extender 42 is comprised of an elongated tubular body 44 providing an internal fluid flow passage 45 and having an externally threaded portion 46 at one end thereof and an internally threaded portion 48 extending inwardly from the other end thereof. Threaded portion 46 is constructed the same as threaded portions 26 and 26' of adapter fittings 10 and 10' so as to threadedly engage an SAE standard straight threaded port and threaded portion 48 is constructed to engage an SAE standard straight threaded member of the type provided by threaded portions 26 and 26' of adapter fittings 10 and 10', respectively. Located internally and immediately adjacent threaded portion 48 is a wrenching portion 49 formed of an internally broached hexagonal configuration. Wrenching portion 49 is accessible through the end of body 44 provided with the internally threaded portion 48 for use in the assembly and disassembly of port extender 42 in a manner to be described more fully hereafter.

Figure 9:
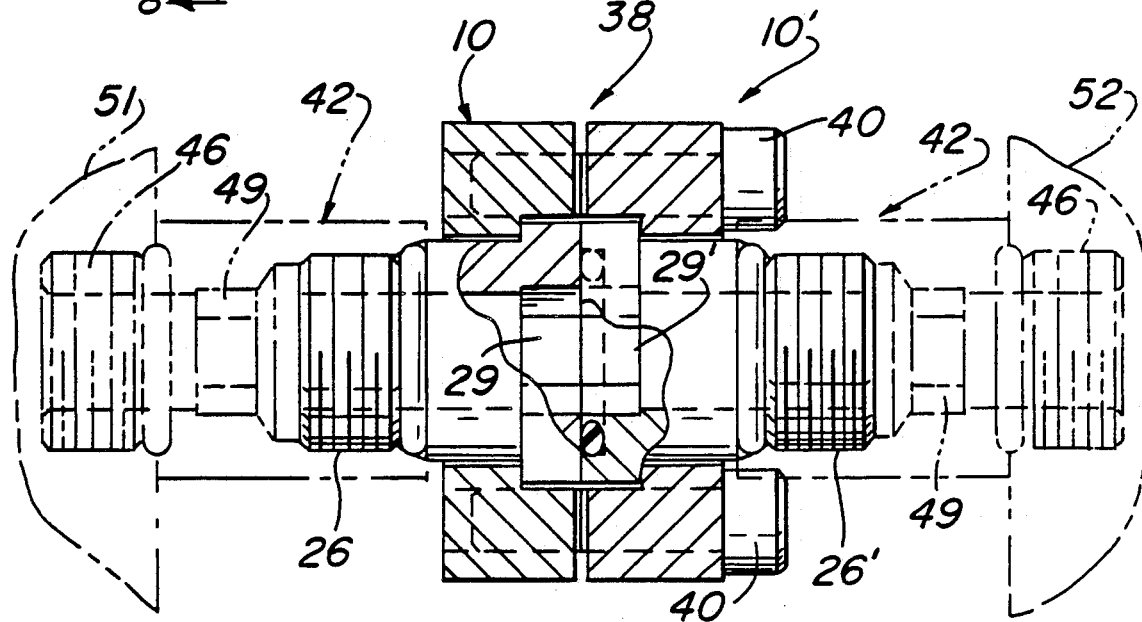
FIG. 9 is a view showing the use of port extenders as assembled to flange union connections.

In FIG. 9, there is shown an assembly of a union flange connection 38 and a pair of port extenders 42 to connect to threaded terminal ports of flow components 51 and 52. In this arrangement, the threaded port of component 51 is furnished with a port extender 42 connected to adapter fitting 10 while the threaded port of component 52 is engaged with a port extender 42 which is mounted on adapter fitting 10', as is apparent from a consideration of FIG. 9.

Figure 18:
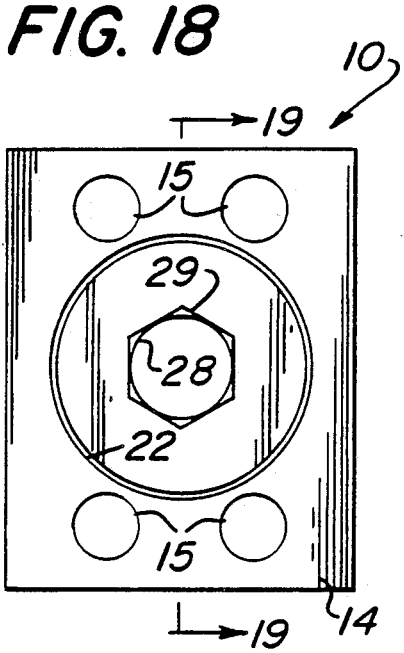
FIG. 18 is a front elevation of a port adapter fitting in accordance with the invention employing a port extender.
Figure 19:
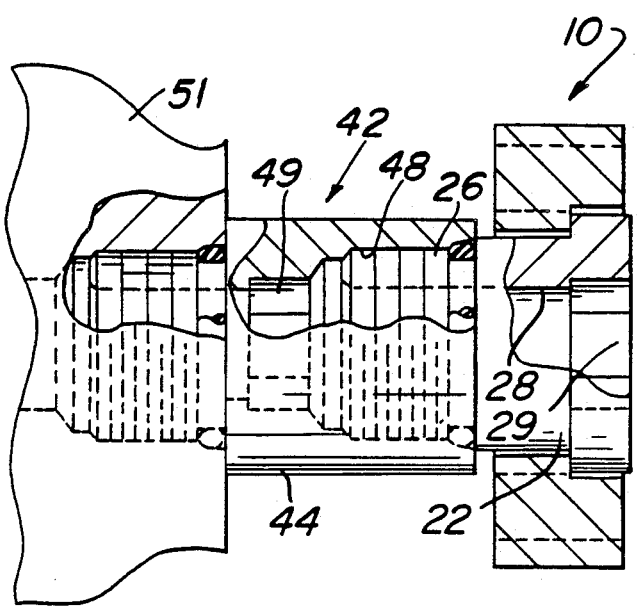
FIG. 19 is a sectional view of the adapter shown in FIG. 18.

A preferred way of assembling the assembly shown in FIG. 9 would be to, as a first step, assemble each port extender 42 to its associated adapter fitting 10 or 10' and to the associated outlet port of the component 51 or 52 manually, or, if necessary, with the assistance of an appropriate tool. Thereafter, by the procedure of center drive wrenching the adapter fitting 10 or 10' to its proper torque level (by use of wrenching surfaces 29 or 29' thereof), all the connections in the series are simultaneously torqued to the same proper torque level. This is even true when more than one port extender 42 is employed in a row to properly locate the associated flange connection. Further, when adapter fitting 10 or 10' employs a port extender 42 in accordance with this invention, it will be apparent, as is best shown in FIGS. 18 and 19 which show an adapter fitting 10 with its port extender 42 connected to the terminal port of flow component 51 or in FIGS. 24 and 25 which show an adapter fitting 10' with a port extender 42, that there are no external wrenching surfaces exposed to invite unskilled tampering with the properly torqued joints. This further ensures that once the assembly is properly torqued, it remains in this properly torqued condition.

In an assembly such as that shown in FIGS. 18 and 19, if it should become necessary to remove the adapter fitting 10 and its associated port extender 42 from the component's port, such as when a component must be repaired and replaced, it is only necessary to wrench the assembly from the center drive of adapter fitting 10, ie., wrenching surface 29 and, if fortunate, the connection at the component's port is the one that will become loose. The adapter fitting 10 and its associated port extender 42 can then be removed as an assembly. However, during this assembly, there are then no assurances that the joint at the component will loosen first. If the joint between the adapter fitting 10 and the port extender 42 loosens first, it would be necessary to completely separate these two elements. Then, by employing its center drive, i.e., wrenching surface 49, the port extender 42 may be wrenched out of the port of component 51. It is to be noted that each of the center drives 29 and 49 is very accessible in this arrangement and that the total job can be done from the same position and with the same tools.

Figure 14:
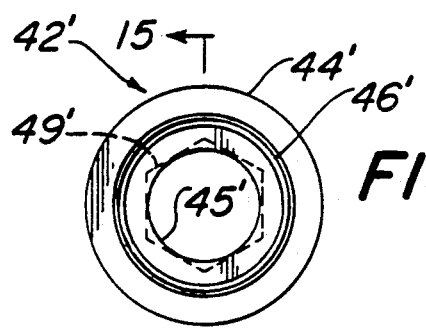
FIGS. 14 and 15 are end and side views, respectively, of another port extender in accordance with the invention.
Figure 15:
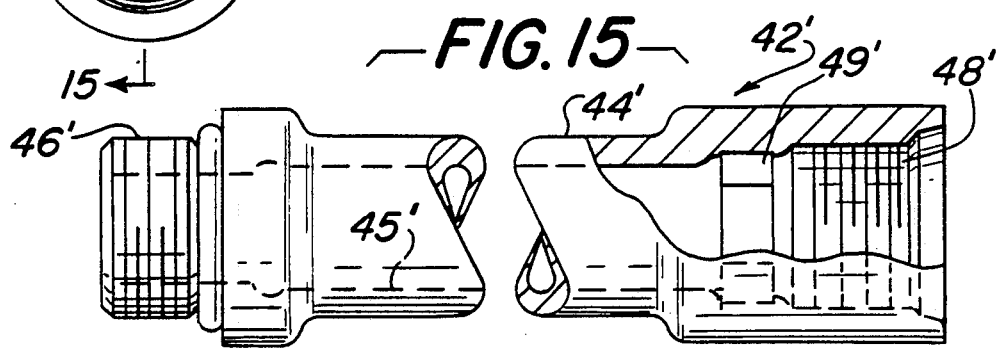

In FIGS. 14 and 15 there is shown an extra long port extender 42', which is constructed in a manner similar to the port extender 42 whereby corresponding parts have been given the same reference numerals with primes added. Thus, port extender 42' is comprised of an elongated tubular body 44' which provides an internal fluid flow passage and is substantially longer than its corresponding body 44 of port extender 42. Body 44' has an externally threaded port 46' at one end thereof and an internally threaded port 48' at the other end constructed in the identical manner as the corresponding portions 46 and 48 of port extender 42. There is provided a wrenching portion 49' located immediately inwardly of internally threaded portion 48'.

Figure 10:
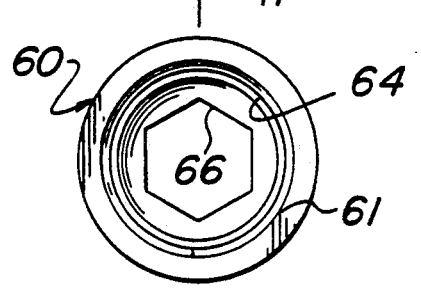
FIGS. 10 and 11 are end and side views, respectively, of a connector in accordance with the invention.
Figure 11:
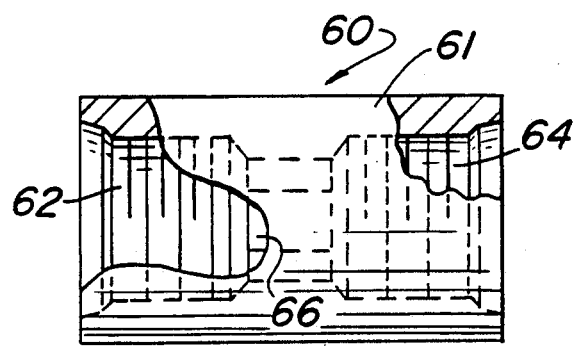

In FIGS. 10 and 11 there is shown a connector 60 for use in conjunction with two adapter fittings in accordance with the invention when it is desired to interconnect two flange ported components of the same size. To this end, the connector 60 is comprised of an elongated tubular body 61 having an internally threaded port 62 at one end thereof and an internally threaded port 64 at the other end thereof. The threaded ports 62 and 64 are constructed to threadedly engage a SAE standard straight thread of the type provided by threaded portions 26 or 26' of adapter fittings 10 and 10', respectively. Located internally between the inner ends of the two threaded portions 62 and 64 is a wrenching portion 66 formed of an internally broached hexagonal configuration. Wrenching portion 66 is usable during the assembly and disassembly of the connector 60 to the adapter fittings 10 and 10' in a manner to be described more fully hereafter.

Figures 24, 25:
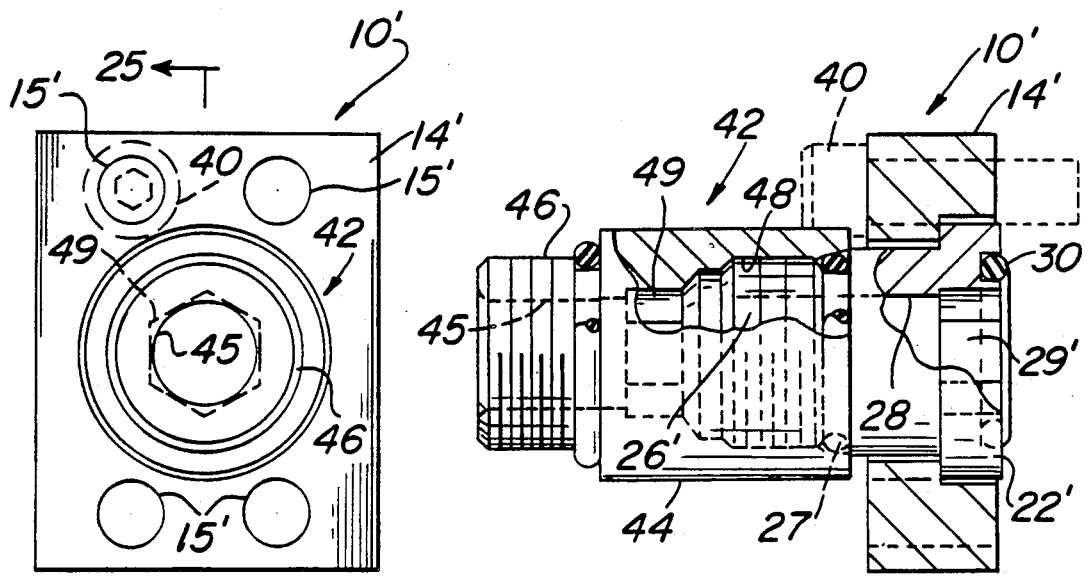
FIG. 24 is a front elevational view of an adapter fitting in accordance with the invention employing a port extender.
FIG. 25 is a sectional view taken on line 25—25 of FIG. 24.

Reference is now made to FIGS. 22 and 23 which shows an assembly where two adapter fittings 10' are assembled to a connector 60 to provide a flange connector assembly. The proper way to make this assembly shown in FIGS. 22 and 24 is to lock a wrench in one of the wrenching portions 29' of one adapter fitting 10' while torque wrenching the wrenching portion 29' of the other adapter fitting 10' at the opposing end to its proper tightening torque. In this manner, both joints are simultaneously tightened to the same correct torque. It is noted that when the assembly is made, there are no external wrenching surfaces provided on the connector 60 that would invite anyone to tamper with the pretorqued values of the assembly and thereby damage the intergrity of the properly made mechanical connection. Further, the lack of any external wrenching surface helps to require that the proper assembly and torquing procedures are used, ie., the procedure involving locking the one center drive while torque wrench tightening the other center drive to result in two correctly torqued mechanical joints.

In the event that it becomes necessary to disassemble the flange connector assembly shown in FIGS. 22 and 23, a procedure which is the opposite of the above-described procedure should be employed. However, when this is done, there is no assurances as to which joint will loosen first. Which ever one does loosen, it then must be completely unthreaded. This will expose a center drive in that end of the connector 60 and the same procedure is then employed to disassemble the remaining adapter fitting 10 from the connector 60.

It will be apparent that the connector 60 can also be employed with two adapter fittings 10 and with one adapter fitting 10 and one adapter fitting 10' to thereby provide the maximum piping system flexibility for the fittings and connectors of the invention.

Figure 12:
FIGS. 12 and 13 are end and side views, respectively, of another connector in accordance with the invention.
Figure 13:
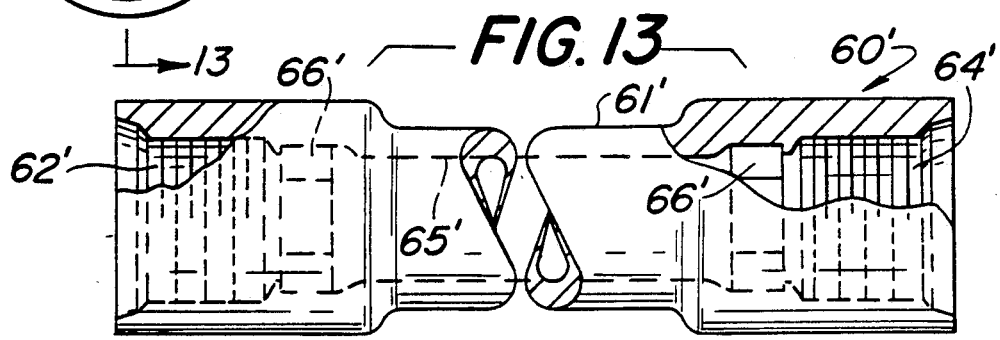

In FIG. 13 there is shown another connector 60' in accordance with the invention which is longer than the connector 60 for use in applications where a greater separation is required between the adapter fittings. Since the connector 60' shown in FIGS. 12 and 13 is essentially the same as connector 60 shown in FIGS. 10 and 11, corresponding parts have been given the same reference numerals with primes added. Thus, connector 60' is comprised of an elongated tubular body 61' having internally threaded ports 62' and 64' extending inwardly from the opposite ends thereof, said threaded ports being constructed to engage a standard SAE threaded member of the type provided by threaded portions 26 and 26' of adapter fittings 10 and 10', respectively. Immediately inwardly of each of the internally threaded ports 62' and 64' there is provided a wrenching portion 66' formed of an internally broached hexagonal configuration. It will be noted that the body 61' of connector 60' is substantially longer than body 61 of connector 60. By providing a wrenching portion 66' adjacent each of the threaded portions 62' and 64', wrenching portions 66' will be accessible to a wrenching tool from either end of the connector 60'.

In FIGS. 20 and 21 there is shown another connector 60'' which is essentially identical to connector 60' except that the middle portion of the body 61'' is comprised of a straight tube.

Figure 26:
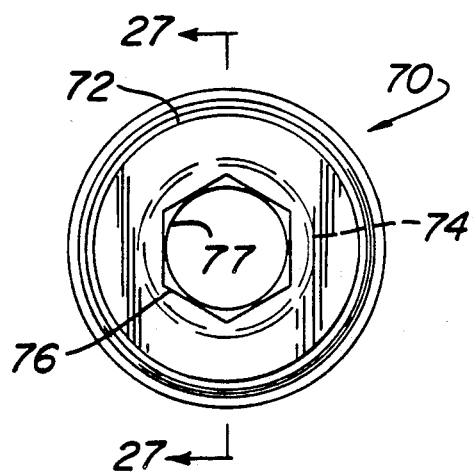
FIGS. 26 and 27 are end and side views, respectively, of a reducer-type of connector in accordance with the invention.
Figure 27:
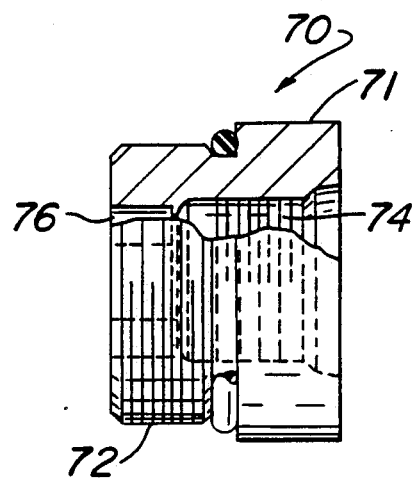

In FIGS. 26 and 27 there is shown a reducer 70, which is to be used to interconnect components of different size ports. To this end, there is shown a reducer 70 comprised of a tubular body 71 having an externally threaded portion 72 at one end thereof and an internally threaded bore 74 extending inwardly from the other end thereof and smaller in diameter than threaded portion 72. Threaded portion 72 is constructed to engage an SAE standard straight thread port and threaded bore 74 is constructed to engage an SAE standard straight thread member such as the threaded portions 26 and 26' of adapter fittings 10 and 10', respectively. Located internally to extend inwardly from the end of body 71 provided with the threaded portion 72 is a wrenching surface 76 formed of an internally broached hexagonal configuration. Tubular body 71 is provided with an internal fluid flow passage 77. The construction is such that threaded portion 72 can be connected to a component port which is larger than internally threaded bore 74 to which an adapter fitting 10 or 10' can be connected whereby reducer 70 can be used to interconnect components of different size ports.

It will be noted that the internal center drive that is provided by wrenching surface 76 in the reducer 70 enables the assembling thereof with the proper torque. Furthermore, as is apparent from FIG. 28, wherein a reducer 70 is shown connected to the port of a fluid flow component 79, there are no external wrenching surfaces provided on the reducer 70 that would invite tampering of the torqued values once it is placed in the system.

Figure 29:
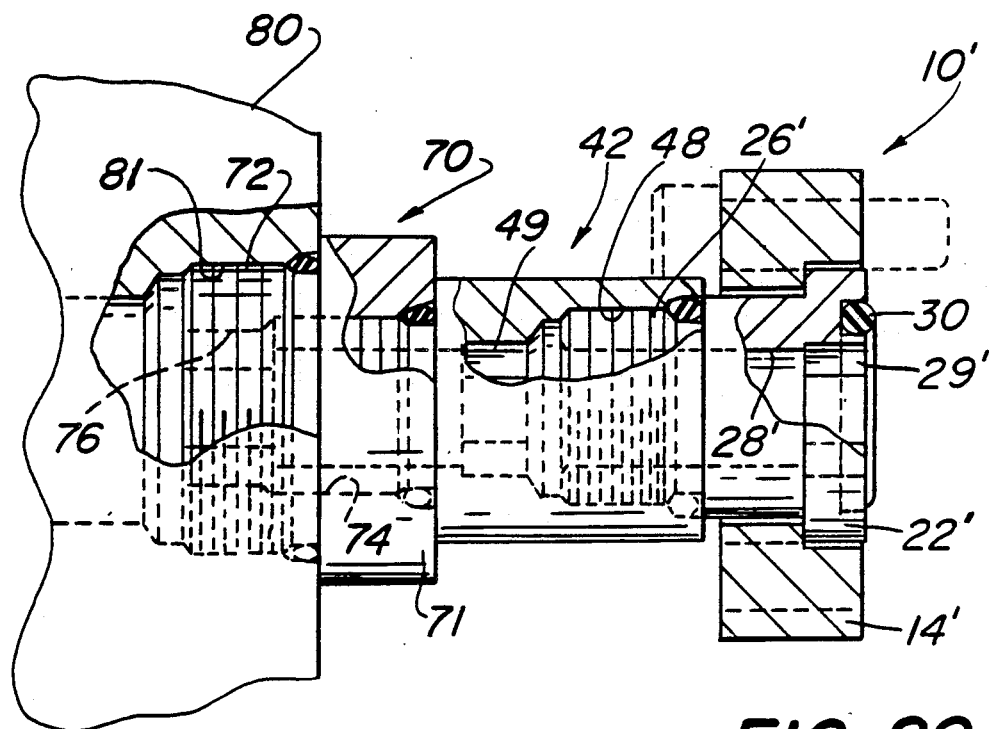
FIG. 29 shows a flange adapter and its port extender connected to a reducer in a component port.

In FIG. 29 there is shown an assembly which comprises an adapter fitting 10' and its port extender 42 connected to a reducer 70 mounted in a port 81 of a fluid flow component 80. Referring to this figure, it will be noted that the proper assembly procedure is to first torque the reducer 70 into the port 81 of component 80. This torque is a higher value than that torque required for the smaller thread of the adapter fitting 10' and its port extender 42. The adapter fitting 10' and its port extender 42 can then be tightened by a torque wrench to their proper torque by employing the center drive wrenching surface 29' of the adapter fitting 10' as described above without affecting the higher torqued value of the reducer 70. The disassembly of the assembly shown in FIG. 29 is by the reverse procedure described above.

Figure 16:
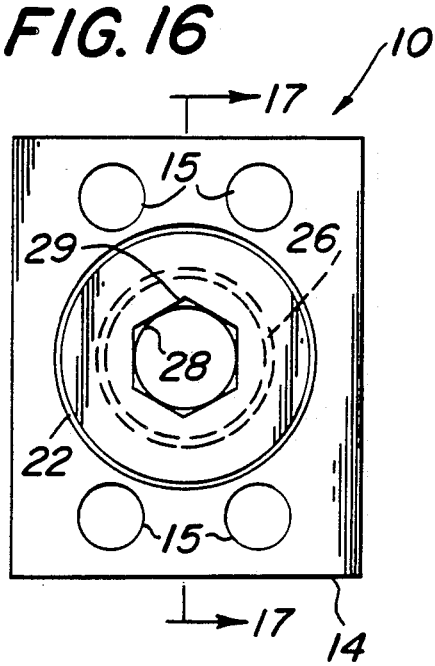
FIG. 16 is a front elevation of a flange port adapter connected to a reducer and fitted in a component port.
Figure 17:
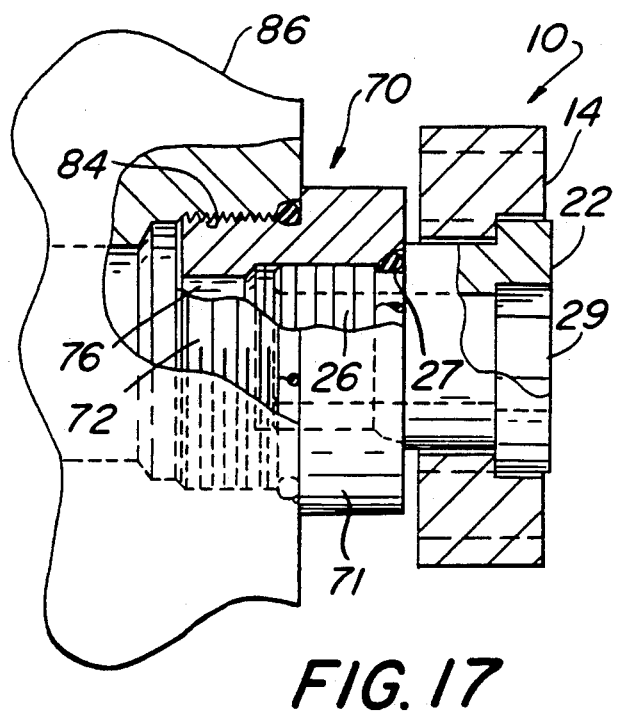
FIG. 17 is a sectional view of the adapter shown in FIG. 16.
Figure 28:
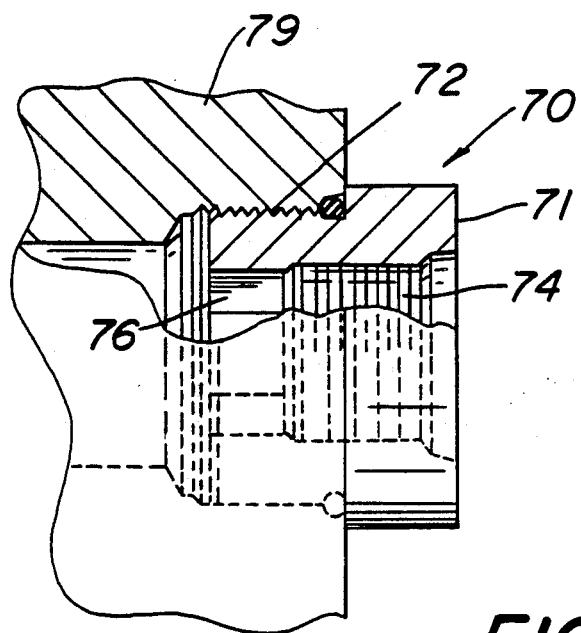
FIG. 28 is a view showing a reducer of the type shown in FIGS. 26 and 27 assembled into a component port.

In FIGS. 16 and 17 there is shown an adapter fitting 10 connected to a reducer 70 in a port 84 of a component 86. It will be apparent that the assembly and disassembly procedures for the arrangement shown in FIGS. 16 and 17 will be the same as those employed with respect to the arrangement as shown in FIGS. 28 and 29.

It will be apparent to those skilled in the art that there are many advantages of a piped system employing the components of the invention, ie., adapter fittings 10 and 10' port extenders 42, connectors 60 and reducers 70. One important advantage as applied to piping systems for high performance, high pressure hydraulic systems is that the system in accordance with the invention permits every component to be piped with a preferred face flange union in close proximity to the component. Easy and effective component insertion and removal from the system for testing, maintenance and replacement is also permitted. Further, all joints are made with threaded and sealed geometries that ensure high integrity piped systems thereby eliminating the need for welded construction in many applications. Furthermore, this high integrity piping system can be properly assembled with relatively small torque wrenches by workmen with a minimum of skill and training and assembly techniques that lend themselves to power tools for increased productivity and substantial cost reductions. The assemblies of the invention can be made in a very compact manner thereby saving valuable space, and since all tubular outer surfaces are smooth and without wrenching surfaces, the system does not encourage tampering, which further helps ensure that the piping system's integrity will remain in tact. In addition, safety wiring of the flange bolts can also be employed to totally discourage all tampering of the piping system by unauthorized persons. A further advantage is that all components of the mechanical piping system are totally reusable, which is a major consideration when used in tooling and testing applications where relatively frequent changes have to be made in high performance piping systems.

In FIGS. 30-34 there are shown adapter fittings similar to adapter fittings 10 and 10' wherein the flange members thereof are configured in a manner suited for manufacturing by casting, forming or forging processes. The flange members shown in FIGS. 30-34 are configured to use less material while achieving the same strength as the flange members used in adapter fittings 10 and 10'. Briefly, this is achieved by the raised rib design best shown in FIG. 30 and to be described more fully hereafter, which design gives the needed strength while using a reduced amount of material. The design is particularly applicable when a rectangular bolt hole pattern is used whereby the bolt holes are spaced apart a greater distance across two legs of the rectangular pattern than across the other two legs thereof. Thus, with this bolt hole pattern, when the flange member is mounted to support a separating load in use, there is a greater moment force between the bolts of the long legs of the rectangular pattern than that between the short legs thereof. Accordingly, the flange members are designed to provide a greater thickness along the portions thereof extending between the long legs of the rectangular pattern so as to withstand the greater moment forces applied thereto during use and so as to maintain a uniform stress throughout the flange member during use.

In FIGS. 30 to 32 there is shown an adapter fitting 10A which is similar to adapter fitting 10 except for a different flange member configuration wherefore corresponding parts have been given the same reference numerals with the suffix A added. Thus, adapter fitting 10A is constructed for converting a straight threaded port to a flange port and comprises two parts, namely, a mounting member 12 and a flange member 14A. Mounting member 12 is identical to that employed in adapter fitting 10 wherefore the same reference numerals are used. Flange member 14A is provided with four threaded bolt holes 15A arranged in a rectangular bolt pattern pursuant to the SAE standard. Flange member 14A has a bore extending between the spaced apart faces 16A and 18A thereof and located in the center of the bolt hole pattern. This central bore comprises a bore portion 17A extending inwardly from face 16A and a bore portion 19A extending inwardly from face 18A. Bore portion 19A has a larger diameter than bore portion 17A whereby they meet at an annular shoulder 20A.

Mounting member 12 is described in detail above with respect to the description of adapter fitting 10. Mounting member 12 has portions 22 and 24 which form an annular shoulder 25 arranged to mate with annular shoulder 20A of flange member 14A so as to limit the relative movement therebetween. Portion 24 of mounting member 12 extends beyond face 16A of flange member 14A and terminates at an externally threaded end portion 26. The parts are configured so that adapter fitting 10A can be connected to a positive seal straight thread such as the SAE threaded port. Mounting 12 is provided with a central axially extending bore 28 providing for a fluid flow passage through adapter fitting 10A. Mounting member 12 is provided with a wrenching surface 29 and arranged to extend inwardly from face 21 so as to provide a mounting that is of a minimum length.

In use, the face of the component bolted to the flange member 14A is provided with a seal that meets face 21 of mounting member 12 in an area extending around the opening of the fluid passage bore 28 therein.

Flange member 14A is configured to achieve the necessary strength equivalent to that provided by flange member 14 with a reduced amount of material. To this end, flange member 14A has a reduced thickness in the upper and lower regions extending horizontally between the bolt holes 15A along the short legs of the rectangular pattern. Further, flange member 14A has a larger thickness, provided by a pair of raised ribs 90 and 91, extending generally vertically between the bolt holes 15A along the long legs of the rectangular pattern. It will be noted by a comparison of flange member 14 and flange member 14A that the wide dimension of flange member 14A at the raised portions 90 and 91 thereof is approximately the same as the uniform thickness of the flange member 14. Also, flange member 14A is provided with rounded corners and reduced height and width dimensions where possible without reducing the strength thereof.

It will thus be apparent that flange member 14 and flange member 14A are essentially equivalents, with flange member 14A having a reduced amount of material whereby it is particularly suited for manufacture by a casting or a forming process.

In FIGS. 33 and 34 there is shown an adapter fitting 10A' for converting a straight threaded port to a flange of a construction corresponding to the flange provided by adapter fitting 10A. Adapter fitting 10A' is essentially the same as adapter fitting 10' (shown in FIGS. 3 and 4) except that it employs a flange member designed in the same manner as flange member 14A. Further, adapter fitting 10A' is essentially the same as adapter fitting 10A except that there is provided a face-mounted seal on the mounting member and the flange member is provided with through (non-threaded) bolt holes. Further, as seen by a comparison of FIGS. 31 and 32 and FIGS. 33 and 34 adapter fitting 10A' is comprised of parts having similar construction and dimension as corresponding parts of adapter fitting 10A. Thus, corresponding parts of adapter fitting 10A' have been provided with the same reference numerals as those of adapter fitting 10A with primes added.

Adapter fitting 10A' is comprised of two parts, namely, a mounting member 12' (identical to that employed in adapter fitting 10') and a flange member 14A'. Flange member 14A' is identical in construction with flange member 14A except that the four bolt holes 15A' thereof, which are arranged in the identical rectangular configuration as bolt holes 15A, are through (non-threaded) bolt holes. Thus, flange member 14A' has a cylindrical bore composed of bore portion 17A' and 19A' extending between faces 16A' and 18A' and meeting at an annular shoulder 20A'. Mounting member 12' has portions 22' and 24' which form an annular shoulder 25' arranged to mate with annular shoulder 20A' of flange member 14A'. Portion 24' of mounting member 12' extends beyond face 16' of flange member 14A' and terminates at an externally threaded end portion 26'. The parts are configured so that adapter fitting 10A' can be connected to a positive seal straight thread such as the standard SAE threaded port. Mounting member 12' is provided with a central axially extending bore 28' providing for a fluid flow passage through adapter fitting 10A'. Mounting member 12' is provided with a wrenching surface 29' arranged to extend inwardly from face 21' so as to provide a mounting that is of a minimum length. An O-ring sealing member 30 is mounted in annular recess 31 of the face 21' of mounting member 12' to provide sealing contact with a fluid flow component mounted in face-to-face contact adjacent thereto.

Flange member 14A' is configured the same as flange member 14A to achieve the necessary strength equivalent to that provided by flange member 14' of adapter fitting 10' with a reduced amount of material. Thus, flange member 14A' has a reduced thickness in the upper and lower horizontally extending regions extending between bolt holes 15A' along the short legs of the rectangular pattern and has a larger thickness, provided by a pair of raised ribs 90' and 91', extending generally vertically between the bolt holes 15A' along the long legs of the rectangular pattern. Also, flange member 14A' is provided with rounded corners and reduced height and width dimensions where possible without reducing the strength thereof.

It will be apparent that various changes may be made in the reconstruction and arrangement of parts without departing from the scope of the invention as defined by the following claims.

What is claimed is:

1. An assembly of adapters for interconnecting two fluid flow components each of which has a threaded terminal port comprising:

a first adapter for adapting a threaded port to a flange port, said first adapter including a flange member having a plurality of bolt holes arranged in a pattern and a bore located within said bolt hole pattern and extending through said flange member, and a mounting member mounted in said bore of said flange member and including a first body portion held in said flange member bore and providing a face for mating with a flanged flow connection, a second body portion extending beyond said flange member to a location spaced therefrom, the extended end of said second body portion having threads formed thereon for engagement with the threaded terminal port of one of said flow components, a fluid flow passage extending through said body portions, and a wrenching surface formed internally of said first body portion of said mounting member and adapted to be engaged by a wrenching mechanism for causing rotation of said mounting member, and a second adapter for converting a threaded port to a flange corresponding to said flange port of said first adapter and including a flange member having a plurality of bolt holes arranged in a pattern corresponding to said bolt hole pattern of said first adapter and a bore located within said bore hole pattern and extending through said flange member, and a mounting member mounted in said bore of said flange member and including a first body portion held in said flange member bore and providing a face for mating with said mating face of said mounting member of said first adapter, a second body portion extending beyond said flange member to a location spaced therefrom, the extended end of said second body portion having threads formed thereon for engagement with the threaded terminal port of the other of said flow components, a fluid flow passage extending through said body portions, means for providing sealing contact between said mating face of said mounting member of said second adapter and said mating face of said mounting member of said first adapter, said sealing means including a sealing member mounted on said second adapter mating face and extending around said fluid flow passage of said second adapter, and a wrenching surface formed internally of said first body portion of said second adapter mounting member and adapted to be engaged by wrenching mechanism for causing rotation thereof, and means cooperable with said flange members for securing said first body portions of said mounting members of said first and second adapters together in mating face-to-face contact with said fluid flow passages thereof in flow communication, said sealing means of said second adapter providing sealing contact between the mating faces of said mounting members of said first and second adapters.

2. An assembly according to claim 1 wherein said wrenching surfaces of said adapters are located to extend inwardly from said mating faces thereof.

3. An assembly according to claim 1 including a port extender mounted on said extended end of the mounting member of at least one of said adapter fittings, said port extender comprising an elongated tubular body having a fluid flow passage extending therethrough between the ends thereof, one end of said port extender body having threads formed externally thereon for engagement with a threaded terminal port, said threads being of the same size and dimension as the threads of said second body portion of said one adapter fitting, the other end of said body having threads formed internally extending inwardly from said other end and adapted to threadedly engage said threads formed on said second body portion of said one adapter fitting.

4. For use in a piping system comprising fluid flow components having threaded terminal ports, a port extender adapted to extend the length of an adapter fitting for converting a threaded flow connection to a flanged flow connection, said adapter fitting including a flange member having a plurality of bolt holes arranged in a pattern and a bore located within said bolt hole pattern and extending through said flange member, and a mounting member mounted in said bore of said flange member and including a first body portion held in said flange member bore and providing a face for mating with a flange flow connection, a second body portion extending beyond said flange member to a location spaced therefrom, the extended end of said second body portion having threads formed thereon for engagement with a threaded terminal port, a fluid flow passage extending through said body portions, and a wrenching surface formed internally in said first body portion of said mounting member and adapted to be engaged by a wrenching mechanism for causing rotation of said mounting member, said port extender comprising:

an elongated body having a fluid flow passage extending internally therethrough between the ends thereof, one end of said port extender body having threads formed externally thereon for engagement with a threaded terminal port, said threads being of the same size and dimension as the threads of said second body portion of said adapter fitting, the other end of said body having threads formed internally extending inwardly from said other end and adapted to threadedly engage said threads formed on said second body portion of said adapter fitting.

5. A port extender according to claim 4 including a wrenching surface formed internally in said port extender body, said port extender wrenching surface being located inwardly of said internally threaded portion and adapted to be engaged by wrenching mechanism for causing rotation of said port extender, said wrenching surface being accessible to a wrenching tool inserted through said internally threaded end.

6. A port extender according to claim 5 wherein said port extender body is of a substantial length with said externally threaded portion being spaced a substantial distance from said internally threaded portion, said wrenching surface being located adjacent said internally threaded portion for access to a wrenching tool inserted through said internally threaded end.

7. A port extender according to claim 6 wherein said wrenching surface of said adapter fitting is located to extend inwardly from said mating face thereof.

8. For use in a piping system comprising fluid flow components having threaded terminal ports, a connector for connecting two flanged components together, at least one of said components comprising an adapter fitting for converting a threaded port to a flanged port, said adapter fitting including a flange member having a plurality of bolt holes arranged in a pattern and a bore located within said bolt hole pattern and extending through said flanged member, and a mounting member mounted in said bore of said flange member and including a first body portion held in said flange member bore and providing a face for mating with a flanged flow connection, a second body portion extending beyond said flange member to a location spaced therefrom, the extended end of said second body portion having threads formed thereon for engagement with a threaded terminal port, a fluid flow passage extending through said body portions, and a wrenching surface formed internally in said first body portion of said mounting member and adapted to be engaged by a wrenching mechanism for causing rotation of said mounting member, said connector comprising:

an elongated body having a fluid flow passage extending internally therethrough from one end to the other, each of said ends of said connector body being internally threaded throughout a portion extending inwardly from an end thereof, each of said threaded portions being adapted to be threadedly engaged with said threads on said second body portion of said adapter fitting and a wrenching surface formed internally of said connector body at a location between the inner ends of said internally threaded portions, said wrenching surface being accessible to and adapted to be engaged by a wrenching mechanism for causing rotation of said connector body.

9. A connector according to claim 8 wherein said connector body has a substantial spacing between said two internally threaded ends thereof and wherein said first-mentioned connector wrenching surface is located adjacent the inner end of one of said internally threaded portions and including a second wrenching surface formed internally in said connector body and adapted to be engaged by a wrenching mechanism for causing rotation of said connector, said second wrenching portion being located immediately inwardly of said internally threaded portion adjacent said other end of said connector.

10. A connector according to claim 9 wherein the portion of said connector body between said wrenching surfaces has a reduced outer diameter as compared with the end portions of the connector body.

11. For use in a piping system comprising fluid flow components having threaded terminal ports, a reducer for interconnecting a threaded component port and an adapter fitting for converting a threaded flow connection to a flanged flow connection, said adapter fitting including a flange member having a plurality of bolt holes arranged in a pattern and a bore located within said bolt hole pattern and extending through said flange member, and a mounting member mounted in said bore of said flange member and including a first body portion held in said flange member bore and providing a face for mating with a flange flow connection, a second body portion extending beyond said flange member to a location spaced therefrom, the extended end of said second body portion having threads formed thereon for engagement with a threaded terminal port, a fluid flow passage extending through said body portions, and a wrenching surface formed internally in said first body portion of said mounting member and adapted to be engaged by a wrenching mechanism for causing rotation of said mounting member, said reducer comprising an elongated body having a fluid flow passage extending internally therethrough between the ends thereof, one end of said reducer body having threads formed externally thereon for engagement with the threaded component port, said externally threaded end having a diameter larger than said threaded extended end of said second body portion of said adapter fitting, the other end of said reducer body having threads formed internally extending inwardly from said other end and adapted to threadedly engage said threads formed on said second body portion of said adapter fitting.

12. A port extender according to claim 11 including a wrenching surface formed internally in said reducer body, said reducer wrenching surface being adapted to be engaged by wrenching mechanism for causing rotation of said reducer, said wrenching surface being accessible to a wrenching tool inserted through said one end of said reducer body.

13. For use in a piping system comprising fluid flow components having threaded terminal ports, a port extender and a reducer for interconnecting a threaded component port and an adapter fitting for converting a threaded flow connection to a flanged flow connection, said adapter fitting including a flange member having a plurality of bolt holes arranged in a pattern and a bore located within said bolt hole pattern and extending through said flange member, and a mounting member mounted in said bore of said flange member and including a first body portion held in said flange member bore and providing a face for mating with a flange flow connection, a second body portion extending beyond said flange member to a location spaced therefrom, the extended end of said second body portion having external threads formed thereon, a fluid flow passage extending through said body portions, and a wrenching surface formed internally in said first body portion of said mounting member and adapted to be engaged by a wrenching mechanism for causing rotation of said mounting member, said port extender including an elongated body having a fluid flow passage extending internally therethrough between the ends thereof, one end of said port extender body having threads formed externally thereon for engagement with a threaded terminal port, said threads being of the same size and dimension as said external threads of said second body portion of said adapter fitting, the other end of said port extender body having threads formed internally extending inwardly from said other end and threadedly engaging said external threads formed on said second body portion of said adapter fitting, said reducer comprising an elongated body having a fluid flow passage extending internally therethrough between the ends thereof, one end of said reducer body having threads formed externally thereon for engagement with the threaded component port, said externally threaded end having a diameter larger than said threaded extended end of said second body portion of said adapter fitting, the other end of said reducer body having threads formed internally extending inwardly from said other end and threadedly engaged with said external threads formed on said one end of said port extender body.

14. A system according to claim 13 including a wrenching surface formed internally in said reducer body, said reducer wrenching surface being adapted to be engaged by wrenching mechanism for causing rotation of said reducer, said wrenching surface being accessible to a wrenching tool inserted through said one end of said reducer body.

15. A port extender according to claim 13 including a wrenching surface formed internally in said port extender body, said port extender wrenching surface being located inwardly of said internally threaded portion and adapted to be engaged by wrenching mechanism for causing rotation of said port extender, said wrenching surface being accessible to a wrenching tool inserted through said internally threaded end.

16. An adapter fitting for connecting a threaded flow connector and a face sealing flanged flow connector comprising:

a flange member having four bolt holes arranged in a rectangular pattern and a bore located within said bolt hole pattern and extending through said flange member, and a mounting member mounted in said bore of said flange member and including a first body portion held in said flange member bore and providing a face for mating with a flanged flow connection, a second body portion extending beyond said flange member to a location spaced therefrom, the extended end of said second body portion having threads formed thereon for engagement with the threaded terminal port of one of said flow components, a fluid flow passage extending through said body portions, and a wrenching surface formed internally of said first body portion of said mounting member and adapted to be engaged by a wrenching mechanism for causing rotation of said mounting member, said flange member having a first pair of body portions of a small thickness extending between the bolt holes along the short legs of said rectangular pattern, and a second pair of body portions of a large thickness extending between the bolt holes along the long legs of said rectangular pattern.

17. An adapter fitting according to claim 16 wherein said second body portions of said flange member are formed by raised ribs.

18. An assembly according to claim 16 wherein said wrenching surface is located to extend inwardly from said mating face of said first body portion of said mounting member.

19. An adapter fitting according to claim 18 wherein said wrenching surface is formed by a multi-sided hole extending inwardly from said one end of said fluid flow passage.

20. An adapter fitting according to claim 18 including means for providing sealing contact between said mating face of said first body portion of said mounting member and a flanged flow connection connected adjacent thereto, said sealing means including a sealing member mounted on said mating face and extending around one end of said fluid flow passage.

* * * * *